Sept. 6, 1960 N. T. GORDON ET AL 2,951,575
CLASSIFIER
Filed April 19, 1956 4 Sheets-Sheet 1
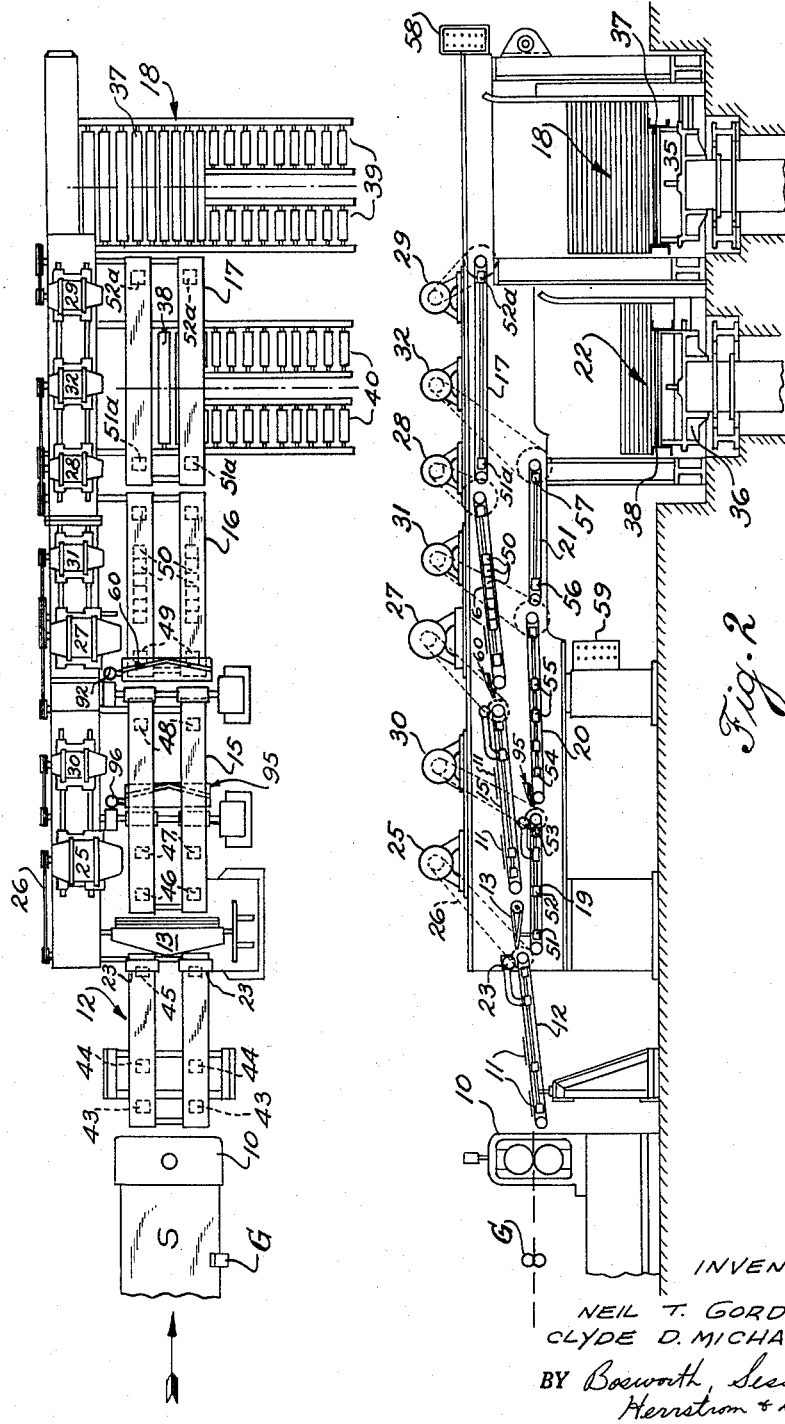
INVENTORS
NEIL T. GORDON
CLYDE D. MICHAELS
BY Bosworth, Sessions
Herrstrom & Lawler
ATTORNEYS

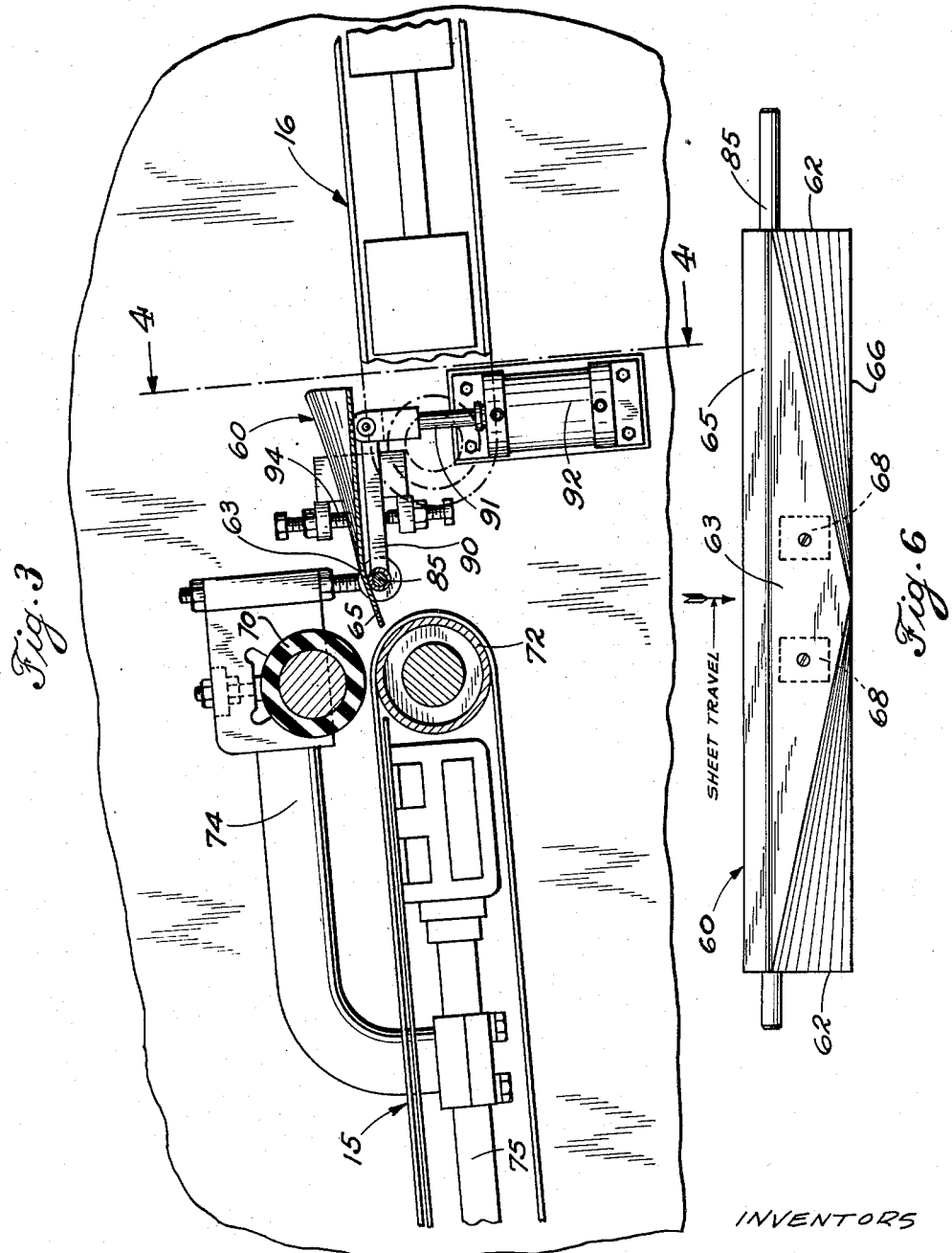

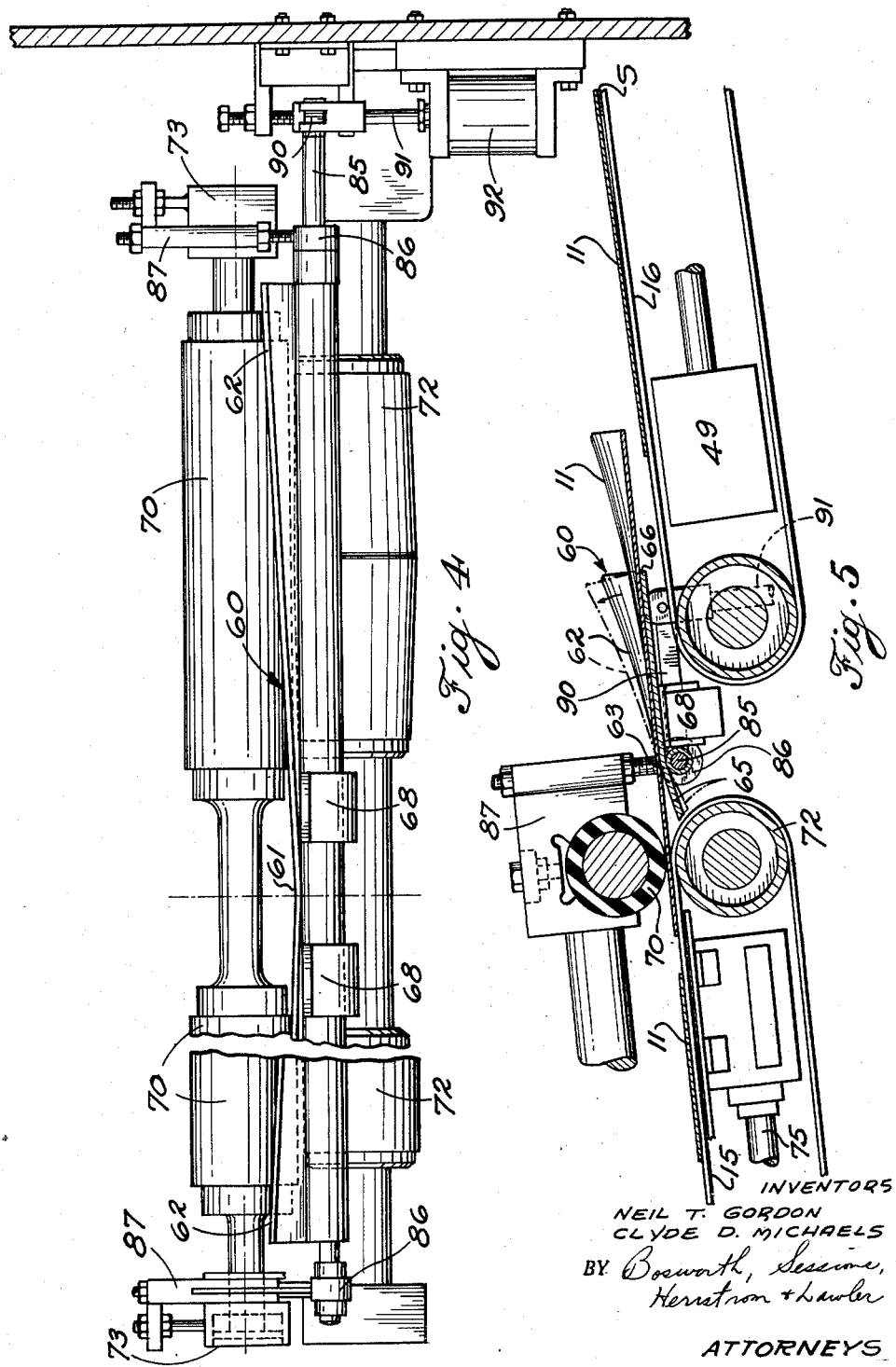

Sept. 6, 1960      N. T. GORDON ET AL      2,951,575
                        CLASSIFIER
Filed April 19, 1956                       4 Sheets-Sheet 4

INVENTORS
NEIL T. GORDON
CLYDE D. MICHAELS
BY Bosworth, Sessions,
Herretrom & Lawler
ATTORNEYS

United States Patent Office 2,951,575
Patented Sept. 6, 1960

2,951,575

CLASSIFIER

Neil T. Gordon, Ellwood City, Pa., and Clyde D. Michaels, Birmingham, Ala.; said Gordon assignor, by mesne assignments, to Blaw-Knox Company, Pittsburgh, Pa., a corporation of Delaware Filed Apr. 19, 1956, Ser. No. 579,367

15 Claims. (Cl. 198—35)

This invention relates to conveyors for sheet material and to methods of conveying sheet material, and particularly to conveyors of the type employed in classifying lines in which tin plate or the like in strip form is sheared into sheets, separated in accordance with its thickness as determined by a gauge or in accordance with other characteristics, and conveyed and piled in two or more separate piles of prime sheets and reject or mender sheets. The invention is described herein in its application to the production of tin plate, but it is to be understood that the invention may be used in conjunction with other materials and modified forms of apparatus and that the description of the preferred form of apparatus contained herein is given only by way of example.

Apparatus for classified sheet metal such as tin plate are well known, one successful type of apparatus being shown, for example, in the Snyder Patent No. 2,697,506, issued December 21, 1954. The present invention may be considered as an improvement upon or further development of apparatus of the general type disclosed in the said Snyder patent. In the operation of such apparatus, tin plate in strip form is first gauged by a flying micrometer, then sheared into sheets by a flying shear. The sheets are carried by a system of belts through a classifying station at which a diverter is arranged to pass sheets of the desired thickness as determined by the gauge to one flight or series of conveyors and to deflect sheets which are not of the desired gauge to another flight or series of conveyors. In some instances, the sheets may be passed through additional diverter stations and again separated in accordance with their characteristics. For example, the sheets may be subjected to a visual inspection or passed through a pin hole detector, and sheets failing to meet the required standards deflected to a separate flight or series of conveyors. In any event, the flights of conveyors lead to separate piles on which the sheets of various characteristics are deposited.

In order to obtain high production and economical operation, the shearing and classifying operations are carried out at high strip speeds; for example, of the order of 1,000 feet per minute. The high speeds introduce serious problems in connection with the handling of the sheets in their travel along the conveyors and in connection with piling the sheets. In order to prevent damage to the sheets when they are deposited on the pilers, it is essential that the sheets be slowed down as they travel along the flights of conveyors and be discharged onto the pilers at speeds considerably less than the speed of the strip as it enters the shear. For example, preferred speeds for depositing sheets of tin plate of ordinary sizes and gauges in the pilers range from about 150 to about 300 feet per minute for tin plate.

It is evident that if the sheets are to be discharged onto the pilers at speeds that are only a fraction of the speed of the entering strip, then as the sheets are slowed down as they travel through the apparatus, they must be deposited on the conveyor belts in overlapping or shingled fashion. The aforesaid Snyder patent is directed particularly to an apparatus or method for slowing down the sheets as they travel through the conveyor and depositing them accurately in shingled or overlapping relation to each other on one of the conveyor belts. In the Snyder apparatus this result is accomplished through the use of a deflector or shingling plate positioned between two of the belts in each flight of conveyors and arranged to bend the sheets so that they are concave upwardly in a direction transverse to their direction of movement and thus are given longitudinal stiffness. By this means, the leading edges of the plates as they are discharged from the first conveyor are held upwardly by their own stiffness. The second conveyor is disposed slightly below the plane of the first belt conveyor so that sheets discharged over the shingling plate are projected above the second belt conveyor and are deposited with their leading edges overlapping the trailing edges of sheets previously deposited on the second belt conveyor. Preferably, the second belt conveyor is provided with a magnet to draw the trailing edges of the sheets down into contact with the second belt conveyor immediately after they cease to be supported by the shingling plate. Thus, the trailing edges of the sheets are moved out of the paths of the leading edges of the following sheets, and the possibility of fouling or jamming of the sheets in their travel through the conveyor is substantially eliminated.

The apparatus and method of the Snyder patent have been used with great success; but in the preferred form of apparatus shown in the Snyder patent, the sheets are projected from the first belt conveyor over a shingling plate, the central portion of which lies substantially in the plane of the first belt conveyor, the plane of the second belt conveyor being at a slightly lower level. This arrangement is entirely satisfactory when the classifying apparatus is operating at its intended high speed. However, troubles occasionally occur when the apparatus is first started and being brought up to speed, or in circumstances where it is necessary to operate the apparatus at speeds substantially lower than the normal high speed for which the apparatus is designed. At lower speeds the shingling plate sometimes does not pitch or project the sheets high enough above the second conveyor to prevent the leading edges of the following sheets from engaging the trailing edges of the preceding sheets. According to the present invention, these difficulties are eliminated by varying the level at which sheets are discharged onto the receiving conveyor as the speed of the apparatus is varied, the sheets being projected at a higher level at low speeds of operation and a lower level at high speeds of operation. Preferably, this is accomplished by providing a shingling plate that can be moved from a position in which it projects the sheets in a line substantially parallel to the plane of the first conveyor when the apparatus is operating at high speeds to a position in which it projects the sheets at a slight upward angle when the apparatus is operated at lower speeds so as to prevent interference between the sheets as they are deposited on the second conveyor. In the preferred forms of the apparatus, the movement of the shingling plate is effected automatically in accordance with variations in the speed of operation of the apparatus.

Referring to the drawings,

Figure 1 is a somewhat schematic plan view of a classifier embodying the present invention, illustrating in addition to the classifier itself a micrometer for gauging the strip and a flying shear for shearing the strip into sheets.

Figure 2 is a side elevation of the apparatus shown in Figure 1.

Figure 3 is an enlarged sectional detail of the shingling plate and associated mechanism in the prime flight of conveyors.

Figure 4 is a transverse view of the apparatus shown in Figure 3, the section being taken along the line 4—4 of Figure 3.

Figure 5 is a fragmentary longitudinal sectional view taken along the line 5—5 of Figure 4 and showing, in broken lines, the shingling plate in raised position.

Figure 6 is a plan view of the shingling plate.

Figure 7:
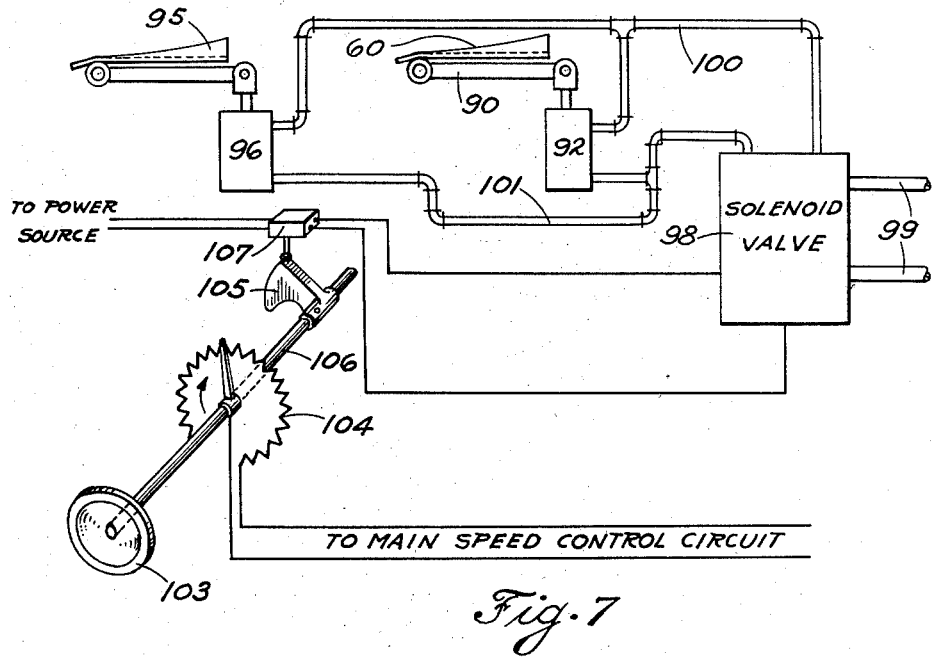
Figure 7 is a simplified diagram showing a preferred form of automatic control for the position of the shingling plate.

According to a preferred form of the invention, and as shown in Figures 1 and 2, a strip S of tin plate or other magnetic material to be classified is first passed through a flying micrometer or other suitable gauge G and then to the flying shear 10 which shears it into sheets 11, a few of which are shown in various locations on the conveyor belts in Figure 2. From the shear the sheets severed from the strip are deposited on the first conveyor 12 which, like the other conveyors in the classifier, is made up of a pair of spaced parallel belts operating on rollers or pulleys at the ends of the belts.

The conveyor 12 is driven at a substantially greater speed than the speed of the strip entering the shear. The purpose of the increased speed of operation is to space the sheets apart on conveyor 12 to give time for the deflector 13 to operate in accordance with the signals given to it by the flying micrometer G, the sheets being delivered to the deflector 13 from the conveyor 12. The arrangement is such that sheets within the established gauge tolerances pass directly over the deflector 13 onto the on-gauge or prime flight made up of conveyors 15, 16 and 17 and leading to piler 18, while sheets that are not within the established tolerances are deflected downwardly by the deflector 13 onto the reject flight made up of conveyors 19, 20 and 21 and leading to the piler 22. Hold-down rolls 23 are positioned in advance of the deflector 13 to hold the sheets properly in engagement with conveyor 12 at the time the leading edges of the sheets pass over or beneath the deflector.

As previously noted, each conveyor is made up of two parallel belts, and the several conveyors are provided with individual motor drives, motor 25 driving conveyor 12 through chain 26, and motors 27, 28 and 29 driving conveyors 15, 16 and 17, respectively, through similar chains. The conveyors 19, 20 and 21 of the reject flight are similarly driven by motors 30, 31 and 32. The speeds of the motors are preferably individually controllable by means of rheostats or other appropriate controls not shown, and the speed of the shear 10 is likewise independently controllable. Preferably the speeds of all of the motors in the line can also be simultaneously varied by means of a variable voltage control supplying current to the shear motor and all of the conveyor motors; a control of this type is disclosed in the Taylor Patent No. 2,328,859, issued September 7, 1943.

The sheets discharged by the last belts in each flight drop onto the pilers 18 and 22 which comprise elevating platforms 35 and 36 having their upper surfaces made up of conveyor rolls 37 and 38. These platforms are raised at the beginning of a run and gradually lowered by the operator as sheets accumulate on them, and roller conveyors 39 and 40 are provided for removing piled sheets from the platforms in lateral directions. The pilers preferably are constructed as described and claimed in the Snyder Patent No. 2,636,736, issued April 28, 1953.

In order to retain the sheets in position on the belts and to straighten them if they become askew in their travel through the apparatus, electromagnets are disposed in pairs beneath the upper reaches of the belts of the several conveyors. The magnets associated with conveyor 12 are indicated at 43, 44 and 45, and those associated with conveyor 15 at 46, 47 and 48. Magnets 49 and groups of magnets 50 are positioned beneath the upper reaches of the belts in conveyor 16, and magnets 51a and 52a beneath the upper reaches of the belts in conveyor 17. Similar magnets are employed in conjunction with the conveyors in the reject flight, these magnets and groups of magnets being indicated by reference characters 51, 52, 53, 54, 55, 56 and 57. Preferably the magnets are constructed and arranged as described in the Snyder and Gordon Patent No. 2,604,971, the energization of the magnets being controllable by the operator through suitable circuits and the push-button switchboards 58 and 59 for the prime and reject flights respectively.

As noted above, classifiers of this type are designed for operation at high speeds. For example, the strip may enter the shear at a speed of approximately 1,000 feet per minute and the conveyor 12 may be operated at a speed of 1,133 feet per minute. Because of the increase in speed, the sheets are spaced apart a few inches on conveyor 12. The speed of the sheets is progressively reduced as they travel along subsequent conveyors so that the sheets can be piled accurately without damage. In the example given, conveyor 15 may be operated at a speed of 1,066 feet per minute, conveyor 16 at about 650 feet per minute and conveyor 17 from about 150 to about 300 feet per minute. The reduction of speed on conveyor 15 reduces the spacing between the sheets to a fraction of an inch, while on conveyor 16 the sheets overlap each other in a shingled manner; for example, the overlap may amount to about 35% on conveyor 16 and increase to 60% to 80% or more as the speed of the sheets is further reduced on conveyor 17. The speeds of the conveyors in the reject flight are preferably of the same order.

In order to prevent engagement between the leading edge of a following sheet which has not yet touched the receiving conveyor 16 and the trailing edge of a preceding sheet which is at least in part in contact with conveyor 16, the receiving conveyor 16 is preferably disposed at a lower level than the plane of delivering conveyor 15 and a shingling plate indicated in general at 60 is interposed between the conveyors 15 and 16 in order to hold the leading edges of the sheets above the receiving conveyor; the construction and mounting of the plate are shown particularly in Figures 3, 4, 5 and 6. The plate 60 preferably is composed of a highly polished nonmagnetic or slightly magnetic metal, stainless steel being satisfactory. The plate preferably is in the form of a flat V having a lower central portion 61 and raised side portions 62; the rear or entry portion of the plate is substantially flat as shown at 63, and the rear edge 65 of the plate is turned down to receive the leading edges of the sheets. The flat rear portion 63 and the longitudinal center of the plate lie substantially in the plane of the upper surface of the delivering conveyor 15 when the apparatus is operating at high speeds, and the side portions 62 of the plate are bent progressively upwardly to give the plate its flat V shape at the front edge 66 thereof.

In order to urge the central portions of the sheets downwardly toward the central portion 67 of the shingling plate, permanent magnets 68 are disposed beneath the central portion of the shingling plate on either side of the center line thereof. Thus, as the sheets travel over the shingling plate, the edges are bent upwardly while their centers are held down, curving the sheets in a direction transverse to their direction of travel and giving them an upwardly concave shape which increases their longitudinal stiffness and prevents the leading edges of the sheets from dropping downwardly toward the conveyor 16. It will be noted that with sheets of the usual dimensions handled in the apparatus, the trailing edges of the sheets are engaged by and held downwardly in engagement with the upper surface of the conveyor 15 by the hold-down rolls 70 which are disposed immediately above the forward conveyor rolls 72 of conveyor 15. Hold-down rolls 70 are carried by suitable bearings 73 mounted in brackets 74, the brackets being supported by the longitudinally extending members 75.

The apparatus described above is substantially the same as the apparatus of the aforesaid Snyder Patent No. 2,697,506 and when the shingling plate is disposed as shown in Figure 3 and in full lines in Figure 5, the apparatus operates substantially the same as the apparatus of the Snyder patent, the sheets being projected above the plane of the receiving conveyor 16 and the trailing edges of the sheets being attracted to the conveyor 16 by the magnets 49 and 50.

In the present invention, however, in order to improve slow-speed operation and to give the apparatus more flexibility, the shingling plate 60 is mounted, so that its position can be changed for different speeds of operation, on a transversely extending rod 85 that is secured to the plate adjacent the rear or entry portion thereof. Rod 85 is supported in appropriate bearings 86 carried by brackets 87 supported by the members 74 that carry the hold-down rolls 70. In order to change the angle of the shingling plate, a lever 90 is keyed to the rod 85 adjacent one end thereof. The lever is actuated to rotate the rod 85 and thereby change the angle of the shingling plate by means of the piston rod 91 of the fluid pressure cylinder and piston mechanism 92. Thus, by actuating the piston of the cylinder and piston mechanism 92, the shingling plate can be adjusted from its normal or high speed position such as shown in Figure 3 and in full lines in Figure 5 to an elevated position such as shown in broken lines in Figure 5. In elevated position, the sheets are deflected slightly upwardly from a line parallel to the plane of the delivering conveyor 15 and for a given speed are thrown or pitched farther out onto the receiving conveyor 16 than they would be when the shingling plate is in the lower position with its central portion substantially aligned with the plane of the delivering conveyor. In practice this prevents interference between the forward edges of following sheets and the trailing edges of leading sheets at slow speeds. In general, the shingling plate needs only to be raised a slight amount. For example, the forward edge of the plate may be raised so that the center line of the plate will extend upwardly at an angle of about 15° with the plane of a conveyor 15. The precise amount of elevation required depends upon the nature of the operation and can readily be determined by experience. Adjustment of the extreme positions of the shingling plate is effected by means of stop screws 93 and 94 which engage the lower and upper sides of the lever 89, the screw 93 controlling the lower position of the shingling plate 60, and the screw 94 engaging the upper side of the lever 89 to limit the distance to which the lever can be raised by the cylinder 92.

A shingling plate 95 is interposed between conveyors 19 and 20 in the reject flight. Shingling plate 95 and its associated mechanisms, including fluid pressure cylinder and piston mechanism 96, are similar in all material respects to the shingling plate 60 and its associated mechanisms; accordingly, shingling plate 95 and its associated mechanisms are not described in detail herein.

A preferred form of control for actuating the shingling plates 60 and 95 is shown diagrammatically in Figure 7 of the drawings. This control includes a solenoid valve 98 which is connected by appropriate conduits 99 to a source of fluid under pressure and is also connected by conduits 100 and 101 to the fluid pressure cylinders 92 and 96. In the embodiment shown, a spring-returned solenoid valve is employed. When the valve is de-energized, the shingling plates 60 and 95 are in their raised position and have their central portions lying at a slight upward angle to the plane of the delivery conveyors 15 and 19 as shown in broken lines in Figure 5; when the valve is energized, the cylinders 92 and 96 lower the shingling plates 60 and 95 to the position in which their central portions lie substantially in the planes of the delivering conveyors 15 and 19.

The solenoid valve may be controlled by any convenient means such as push buttons under the control of the operator, but preferably the operation of the solenoid valve is automatically correlated with the speed of the apparatus so that when the apparatus reaches a predetermined speed, the shingling plates 60 and 95 are automatically moved to the high speed operating positions. A simple means for accomplishing this is illustrated diagrammatically in Figure 7. As shown in that figure, a hand wheel 103 is provided for controlling a rheostat 104 that governs the main speed control of the entire apparatus—for example, a variable voltage control that controls the speed of all of the motors of the classifier. A cam 105 is mounted on the rheostat shaft 106; the cam is arranged to engage a limit switch 107 at a predetermined point when the rheostat control is rotated in a clockwise direction to increase the speed of the apparatus. Actuation of the limit switch 107 by the cam energizes the solenoid valve so that cylinders 92 and 96 are caused to move the shingling plates 60 and 95 to their lower positions for high speed operation. Conversely, as the rheostat is rotated in a counterclockwise direction to reduce the speed of the apparatus, the solenoid valve is de-energized when the cam 105 becomes disengaged from the limit switch 107 and causes the cylinders 92 and 96 to raise the shingling plates 60 and 95. By adjusting the angular position of the cam 105 on the shaft 106, the position of the rheostat 104 at the time that the cam 105 engages the limit switch 107 can be varied and, therefore, the speed at which the cylinders act to lower the shingling plates into the high speed position can be set to a desired predetermined value. With ordinary gauges and sizes of tin plate, it is satisfactory to adjust the apparatus so that the shingling plates are lowered to high speed position when the delivering conveyors 15 and 19 are operating at a speed of about 650 feet per minute.

Figure 8:
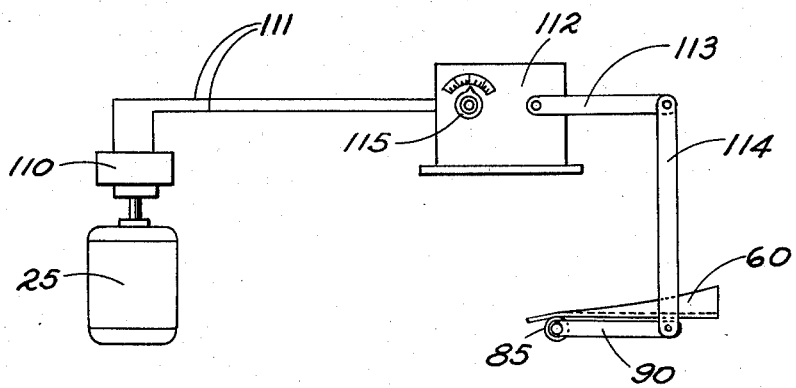
Figure 8 is a diagram similar to Figure 6 but showing a modified form of automatic control for the position of the shingling plate.

A modified form of automatic control wherein the angle of the shingling plate is gradually changed with varying speeds of operation of the apparatus is shown in Figure 8 as applied to the prime flight of conveyors and the shingling plate 60. A similar apparatus would be employed in the reject flight of conveyors in conjunction with the shingling plate 95. In this apparatus the motor 27 that drives delivering conveyor 15 also drives a tachometer generator 110. The output of the tachometer generator 110 is connected by means of conductors 111 to the apparatus indicated diagrammatically at 112, which is arranged so that the arm 113 is progressively lowered as the voltage output of the tachometer generator 110 is increased. Arm 113 is connected by link 114 to lever 90 attached to shaft 85 on which the shingling plate 60 is mounted, and thus the position of the shingling plate is varied in accordance with the output of the tachometer generator and in accordance with the speed of the motor 25. Control apparatus such as indicated at 112 is readily available on the market, a suitable apparatus being manufactured by Leeds & Northrup Company of Philadelphia, Pennsylvania, under the name of Electric Valve Drive. The apparatus is provided with a control indicated at 115, whereby the response of the apparatus to changes in output of the tachometer generator can be varied. In general, it is desirable to set the control so that the shingling plates are gradually lowered as the speed increases and reach their high speed operating position when the delivering conveyors have reached a speed of, for example, 650 feet per minute.

From the foregoing description of preferred forms of the invention, it will be evident that we have disclosed herein an improved conveying mechanism for sheet material whereby sheet material such as tin plate can be deposited accurately in shingled relationship upon a receiving conveyor throughout a wide range of speeds of operation of the conveying mechanism. By the use of our apparatus, shingling can be accomplished both at low and high speeds of operation with the substantial elimination of cobbles in the shingling operation. This result is accomplished primarily by varying the height at which the sheets are discharged onto the receiving conveyor as the speed of operation of the delivering conveyor changes, the height being reduced for low speeds and increased for high speeds. The increased elevation of the sheets with respect to the receiving conveyor as they are pitched from the delivering conveyor at low speeds enables the leading edges of the sheets to project sufficiently above the receiving conveyor so that they do not engage the trailing edges of preceding sheets as they are being deposited on the receiving conveyor.

Those skilled in the art will appreciate that various changes and modifications can be made in the invention without departing from the spirit and scope thereof. The essential characteristics of the invention are defined in the appended claims.

We claim:

1. In a conveyor system for sheet material, means adapted to feed sheets onto a generally horizontal, continuously moving receiving conveyor at a speed greater than the speed of the receiving conveyor whereby said sheets are deposited on said receiving conveyor in partially overlapping relation with the leading portion of each sheet overlying the trailing portion of a preceding sheet, said feeding means being adapted to discharge the sheets onto the receiving conveyor from a level above the receiving conveyor, and power operated means for changing the position of said feeding means with respect to said receiving conveyor thereby to vary the height at which the leading portions of the sheet are projected over said receiving conveyor.

2. In a conveyor system for sheet material, means adapted to feed sheets onto a generally horizontal, continuously moving receiving conveyor at a speed greater than the speed of the receiving conveyor whereby said sheets are deposited on said receiving conveyor in partially overlapping relation with the leading portion of each sheet overlying the trailing portion of a preceding sheet, said feeding means being adapted to discharge the sheets onto the receiving conveyor from a level above the receiving conveyor, and means controlled automatically in accordance with the speed of the sheets delivered by said feeding means for changing the position of said feeding means with respect to said receiving conveyor thereby to vary the height at which the leading portions of the sheet are projected over said receiving conveyor, the height being increased at reduced speeds of the sheets and reduced at increased speeds.

3. In a conveyor system for sheet material, means adapted to feed sheets onto a generally horizontal, continuously moving receiving conveyor at a speed greater than the speed of the receiving conveyor whereby said sheets are deposited on said receiving conveyor in partially overlapping relation with the leading portion of each sheet overlying the trailing portion of a preceding sheet, means for bending said sheets in a lateral direction into an upwardly concave form immediately prior to transferring the same to said receiving conveyor whereby each sheet is given stiffness to enable the leading portion of the sheet to project a substantial distance over and above the trailing portion of a preceding sheet lying on said receiving conveyor, and means automatically controlled in response to changes in speed of said sheet feeding means for varying the height above said receiving conveyor at which the leading portions of the sheet are projected over said receiving conveyor.

4. In a conveyor system for sheet material, means adapted to feed sheets onto a generally horizontal, continuously moving receiving conveyor at a speed greater than the speed of the receiving conveyor whereby said sheets are deposited on said receiving conveyor in partially overlapping relation with the leading portion of each sheet overlying the trailing portion of a preceding sheet, means for bending said sheets in a lateral direction into an upwardly concave form immediately prior to transferring the same to said receiving conveyor whereby each sheet is given stiffness to enable the leading portion of the sheet to project a substantial distance over and above the trailing portion of a preceding sheet lying on said receiving conveyor, and power operated means for changing the position of said bending means with respect to said receiving conveyor to vary the height at which the leading portions of the sheet are projected over said receiving conveyor, the position of said bending means being raised at low speeds of said sheet feeding means as compared to the position thereof at high speeds of said sheet feeding means.

5. Apparatus according to claim 4 wherein means are provided for changing the position of said bending means relative to said receiving conveyor from the position for low speed operation directly to the position for high speed operation when the speed of the feeding means reaches a predetermined value.

6. Apparatus according to claim 5 including a rheostat for controlling the speed of the feeding means, a fluid-pressure cylinder and piston mechanism for changing the position of said bending means with respect to said receiving conveyor, a control for the rheostat and valve means operated in response to the control for the rheostat for controlling said fluid pressure cylinder and piston mechanism.

7. Apparatus according to claim 4 including a tachometer generator driven at a speed functional of the speed of said sheet feeding means, and means responsive to the output of said tachometer generator for gradually lowering said bending means relative to said receiving conveyor as the speed of said sheet feeding means is increased.

8. A conveyor system for sheet material in which sheets are discharged from a continuously moving delivering belt conveyor onto a receiving belt conveyor continuously moving at a speed lower than the speed of said delivering belt conveyor and disposed at a level lower than the delivery end of said delivering belt conveyor, a shingling plate interposed between said conveyors for bending the sheets laterally into an upwardly concave form whereby said sheets are given stiffness to enable the leading portions thereof to project a substantial distance over said receiving conveyor, said plate having a surface the edges of which are raised progressively higher with respect to the center in the direction of travel of the sheets, means to urge the centers of the sheets downwardly toward said plate, and means for changing the position of said shingling plate to vary the height at which said sheets are projected over said receiving conveyor.

9. A conveyor system for sheet material in which sheets are discharged from a continuously moving delivering belt conveyor onto a receiving belt conveyor continuously moving at a speed lower than the speed of said delivering belt conveyor and disposed at a level lower than the delivery end of said delivering belt conveyor, a shingling plate interposed between said conveyors for bending the sheets laterally into an upwardly concave form, whereby said sheets are given stiffness to enable the leading portions thereof to project a substantial distance over said receiving conveyor, said plate having a surface the edges of which are raised progressively higher with respect to the center in the direction of travel of the sheets, and means automatically responsive to the speed of said delivering conveyor for changing the position of said shingling plate to vary the height at which said sheets are projected over said receiving conveyor, the shingling plate being raised at lower speeds of said delivering conveyor to increase the height at which the sheets are projected over said receiving conveyor.

10. Apparatus according to claim 9 wherein the shingling plate is pivoted about an axis adjacent the rear portion thereof.

11. Apparatus according to claim 10 including a fluid pressure cylinder and piston mechanism for pivoting said shingling plate about said axis.

12. Apparatus according to claim 11 including a control for the speed of said delivering conveyor and valve means operated by said speed control for controlling said fluid pressure cylinder and piston mechanism.

13. Apparatus according to claim 9 including a tachometer generator driven at a speed functional of the speed of said delivering conveyor, and means responsive to the output of said tachometer generator for gradually lowering the forward portion of said shingling plate as the speed of said delivering conveyor is increased.

14. A conveyor system for classifiers or the like in which sheets are discharged from a generally horizontal, continuously moving delivering belt conveyor onto a generally horizontal receiving belt conveyor continuously moving at a speed lower than the speed of said delivering belt conveyor and disposed at a level lower than the delivery end of said delivering belt conveyor, a shingling plate interposed between said conveyors for bending the sheets laterally into an upwardly concave form, whereby said sheets are given stiffness to enable the leading portions thereof to project a substantial distance over said receiving conveyor, said plate having a surface the edges of which are raised progressively higher with respect to the center in the direction of travel of the sheets, means associated with said delivering conveyor for holding the trailing edges of the sheets down while the leading edges thereof project beyond said plate, means to urge the centers of the sheets downwardly toward said plate, power operated means for changing the position of said shingling plate to vary the height at which said sheets are projected over said receiving conveyor, and means adjacent the rear end of the receiving conveyor for urging the trailing edges of the sheets downwardly immediately after they are disengaged from said plate.

15. The method of depositing rapidly, continuously moving, closely spaced, successive sheets of material in overlapping shingled arrangement on a substantially horizontal receiving conveyor, which includes the steps of successively discharging the sheets from a delivering conveyor traveling at a higher speed than the receiving conveyor at a level above the level of the receiving conveyor, bending the sheets into a laterally concave shape as they leave the delivering conveyor to give them longitudinal stiffness, thereby to enable the leading portions of the sheets to project over the receiving conveyor, and varying the height at which the sheets are projected over the receiving conveyor, the height being increased for lower speeds of said delivering conveyor and reduced as the speed of the delivering conveyor is increased.

References Cited in the file of this patent

UNITED STATES PATENTS

| | | |
|---|---|---|
| 1,763,308 | Horn | June 10, 1930 |
| 2,697,506 | Snyder | Dec. 21, 1954 |